(12) United States Patent
Bussani et al.

(10) Patent No.: US 8,219,921 B2
(45) Date of Patent: Jul. 10, 2012

(54) PROVIDING AN AD-HOC 3D GUI WITHIN A VIRTUAL WORLD TO A NON-VIRTUAL WORLD APPLICATION

(75) Inventors: Anthony Bussani, Adliswil (CH); Jan L. Camenisch, Thalwil (CH); Thomas R. Gross, Zurich (CH); Dirk Husemann, Einsiedein (CH); Ansgar Schmidt, Leinfelden-Echterdingen (DE); Dieter Sommer, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 12/178,129

(22) Filed: Jul. 23, 2008

(65) Prior Publication Data

US 2010/0023889 A1   Jan. 28, 2010

(51) Int. Cl.
*G06F 3/048* (2006.01)
(52) U.S. Cl. ........ 715/757; 715/848; 715/849; 715/850; 715/851; 715/852
(58) Field of Classification Search .................. 715/757
See application file for complete search history.

(56) References Cited

U.S. PATENT DOCUMENTS

| 6,346,956 B2 * | 2/2002 | Matsuda ................. 715/848 |
| 7,467,356 B2 * | 12/2008 | Gettman et al. ............ 715/850 |
| 2002/0154174 A1 * | 10/2002 | Redlich et al. ............. 345/848 |
| 2004/0104935 A1 * | 6/2004 | Williamson et al. ......... 345/757 |
| 2007/0050716 A1 * | 3/2007 | Leahy et al. .................. 715/706 |
| 2007/0136419 A1 * | 6/2007 | Taylor et al. .................. 709/203 |
| 2008/0215994 A1 * | 9/2008 | Harrison et al. ............. 715/757 |
| 2008/0263458 A1 * | 10/2008 | Altberg et al. ............... 715/757 |
| 2009/0259948 A1 * | 10/2009 | Hamilton, II et al. ........ 715/757 |
| 2009/0265642 A1 * | 10/2009 | Carter et al. ................. 715/757 |

OTHER PUBLICATIONS

Jan Camenisch and Els Van Herreweghen, Design and Implementation of the idemix Anonymous Credential System, ACM, Nov. 18-22, 2002, p. 21-30.*

* cited by examiner

*Primary Examiner* — William Bashore
*Assistant Examiner* — Daniel Um
(74) *Attorney, Agent, or Firm* — Cantor Colburn LLP; Daniel Morris

(57) ABSTRACT

A method for receiving input from a user of a virtual world, the method including: interacting with an object displayed in the virtual world; displaying another object in the virtual world in response to the interacting, the another object adapted to interact with the user; displaying at least one of a user specific label and a service specific label in place of a generic label associated with the another object; selecting the another object; and receiving the generic label and the at least one of the user specific label and the service specific label as the input in response to the selecting.

8 Claims, 4 Drawing Sheets

PROVIDING AN AD-HOC 3D GUI WITHIN A VIRTUAL WORLD TO A NON-VIRTUAL WORLD APPLICATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

This invention relates to interacting with a virtual world, and particularly to interacting by using graphical user interface elements of the virtual world.

2. Description of the Related Art

A virtual world is a computer based environment in which a user can interact. In the virtual world, the user can be represented by a two-dimensional or three-dimensional representation known as an avatar.

The virtual world may be provided by a computer or server remote from the user. The user usually interfaces with the virtual world using a local computer. The remote computer or server may run a virtual world program that includes virtual world components. Sometimes the local computer runs a local application or local components that are integrated with the virtual world components. When this happens, it is often necessary for the user to interact with a virtual world component to provide input for running the local component.

Currently, the user interacts with the local application or component through graphical user interface (GUI) elements. These GUI elements are provided by the local operating system or local window system. However, use of the local operating system breaks the immersive experience in the virtual world expected by the user. The immersive experience is interrupted by (a) using GUI elements outside the environment of the virtual world and (b) presenting GUI elements that are not in any obvious manner connected with the activity within the virtual world that triggered the need for the interaction in the first place.

Furthermore, often it is desirable to maintain the privacy of the user's actions. Most virtual world systems allow multiple users to be active in the virtual world and observe the activities and actions of other virtual world participants. Presenting a GUI element inside the virtual world, therefore, poses the risk of revealing one user's input actions to other observer users. Thus, the privacy of the user providing input can be compromised.

Therefore, what are needed are techniques that provide a user of the virtual world the opportunity to interact with local applications or components as part of the virtual world experience.

BRIEF SUMMARY

The shortcomings of the prior art are overcome and additional advantages are provided through the provision of a method for receiving input from a user of a virtual world, the method including: interacting with an object displayed in the virtual world; displaying another object in response to the interacting, the another object adapted to interact with the user; displaying at least one of a user specific label and a service specific label in place of a generic label associated with the another object; selecting the another object; and receiving the generic label and the at least one of the user specific label and the service specific label as the input in response to the selecting.

Also disclosed is a computer program product stored on machine-readable media, the product including machine-executable instructions for receiving input from a user of a virtual world, the instructions including: interacting with an object using an avatar, the object and avatar displayed in the virtual world; sending an application token from the object to the avatar; forwarding the application token from the avatar to a client; intercepting the application token with a proxy; forwarding the application token from the proxy to a locally running component; injecting a graphical user interface (GUI) request from the component to the proxy; forwarding the GUI request from the proxy to the object; displaying another object in the virtual world in response to the request, the another object adapted to interact with the avatar; sending descriptive packets from a virtual world program to the client, the packets comprising information related to the another object; intercepting the packets using the proxy and modifying the packets by substituting at least one of user specific labels and service specific labels for a generic label associated with the another object; sending the modified packets from the proxy to the locally running component; displaying the at least one of the user specific label and the service specific label to the user; selecting the another object as the input; sending a GUI response message comprising the generic label in response to the selecting from the another object to the avatar; intercepting the GUI response message using the proxy and modifying the GUI response message by adding the at least one of the user specific label and the service specific label; sending the modified GUI response message to the locally running component; and receiving the modified GUI response message to receive the input.

Further disclosed is an apparatus for receiving input from a user of a virtual world, the apparatus having: a computer processing system adapted for running virtual world interface software for implementing a method including: interacting with an object using an avatar, the object and avatar displayed in the virtual world; displaying another object in the virtual world in response to the interacting, the another object adapted to interact with the avatar; displaying at least one of a user specific label and a service specific label in place of a generic label associated with the another object; selecting the another object; and receiving the generic label and the at least one of the user specific label and the service specific label as the input in response to the selecting.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution to the problem of providing input to locally running applications or components as part of the virtual world experience. Using the environment of the virtual world to provide the input allows a user to maintain the virtual world experience. Furthermore, the privacy of a user's actions is maintained by displaying the specific labels and descriptions only in the locally running virtual world component.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates one example of a processing system for practice of the teachings herein;

The detailed description explains the preferred embodiments of the invention, together with advantages and features, by way of example with reference to the drawings.

DETAILED DESCRIPTION

Disclosed are embodiments of techniques, which include a method and apparatus, that provide a mechanism for a non-virtual world application to interact via a virtual world with a user in a secure manner. In general, the techniques allow the user to interact or provide input by using an avatar representing the user. The avatar may be an image displayed in one, two or three dimensions.

The techniques use a proxy to intercept information with generic labels from the virtual world and substitute a user specific label or a service specific label for rendering on a display of the user.

For convenience, certain definitions are presented. The term "client" relates to a software application or system running on a local computer processing system. The client accesses a remote computer or server (referred to as "virtual world server") running the virtual world program. The term "proxy" relates to a software application or system, which services requests of clients by forwarding the requests to the virtual world program running in the virtual world server.

Figure 1:
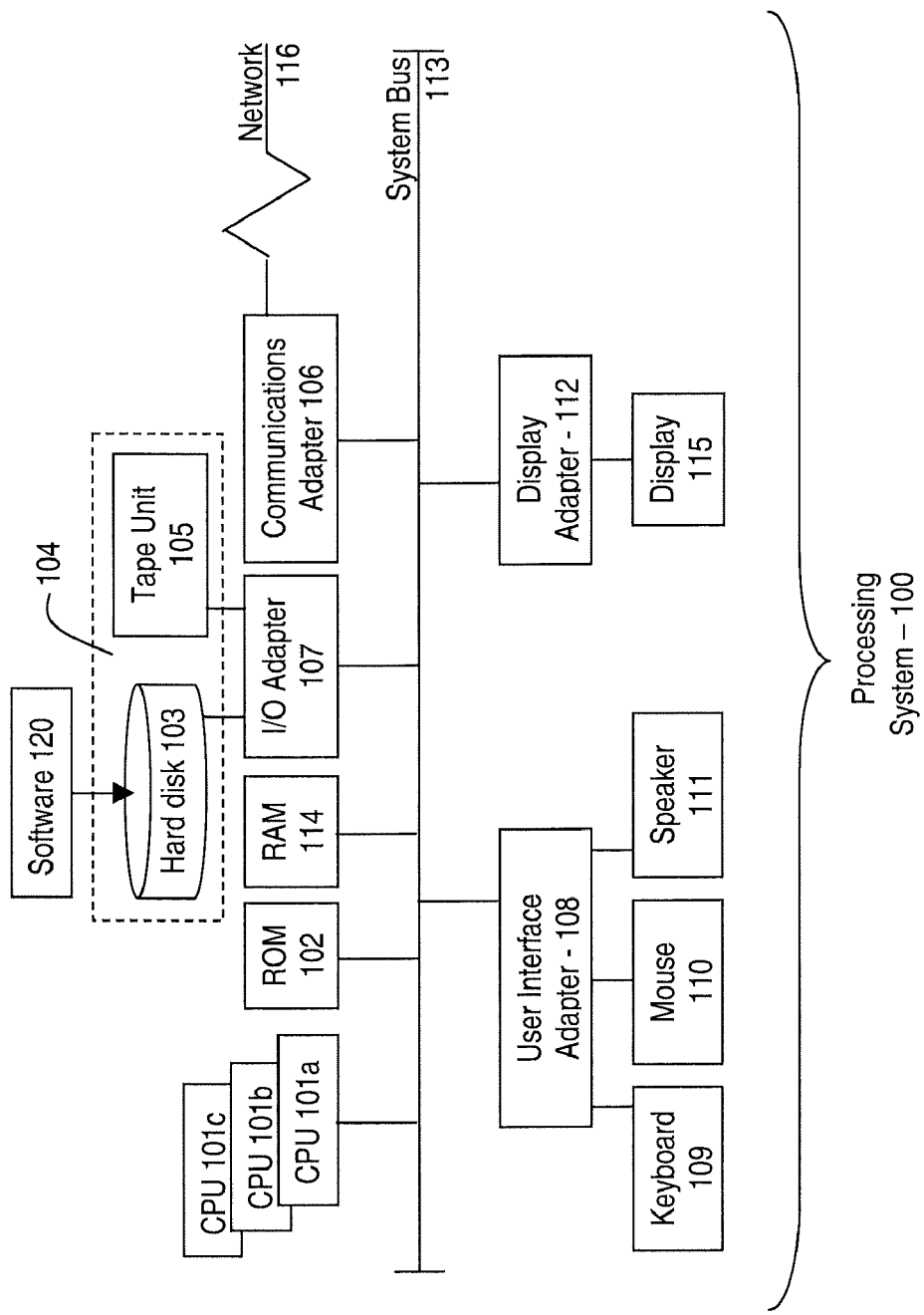

A processing system used for presenting the virtual world to the user is now presented. Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A communications adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device.

Examples of operating systems that may be supported by the system 100 include Windows 95, Windows 98, Windows NT 4.0, Windows XP, Windows 2000, Windows CE, Windows Vista, Macintosh, Java, Linux, and UNIX, or any other suitable operating system. The system 100 also includes a network interface 116 for communicating over a network. The network can be a local-area network (LAN), a metro-area network (MAN), or wide-area network (WAN), such as the Internet or World Wide Web. A server (not shown) can be connected to the network. The server can run the virtual world program to provide the virtual world to the user via the display 115.

Users of the system 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 includes machine-readable instructions stored on machine-readable media (for example, the hard disk 104) for capture and interactive display of information shown on the screen 115 of a user. As discussed herein, the instructions are referred to as "software" 120. The software 120 may be produced using software development tools as are known in the art. Also discussed herein, the software 120 may also referred to as "virtual world interface software" 120. The software 120 may include various tools and features for providing user interaction capabilities as are known in the art.

In some embodiments, the virtual world interface software 120 is provided as an overlay to another program. For example, the software 120 may be provided as an "add-in" to an application (or operating system). Note that the term "add-in" generally refers to supplemental program code as is known in the art. In such embodiments, the software 120 may replace structures or objects of the application or operating system with which it cooperates.

The virtual world interface software 120 generally provides users with a capability to interface with or provide input to local applications or components using an avatar or an object in the virtual world. In general, the virtual world interface software 120 can interface with computer application code programs (for example, C, C++, Perl, Java and others), other programs typically regarded as computing environments (UNIX, Linux, DOS, and others) as well as other types of programs.

Figure 2:
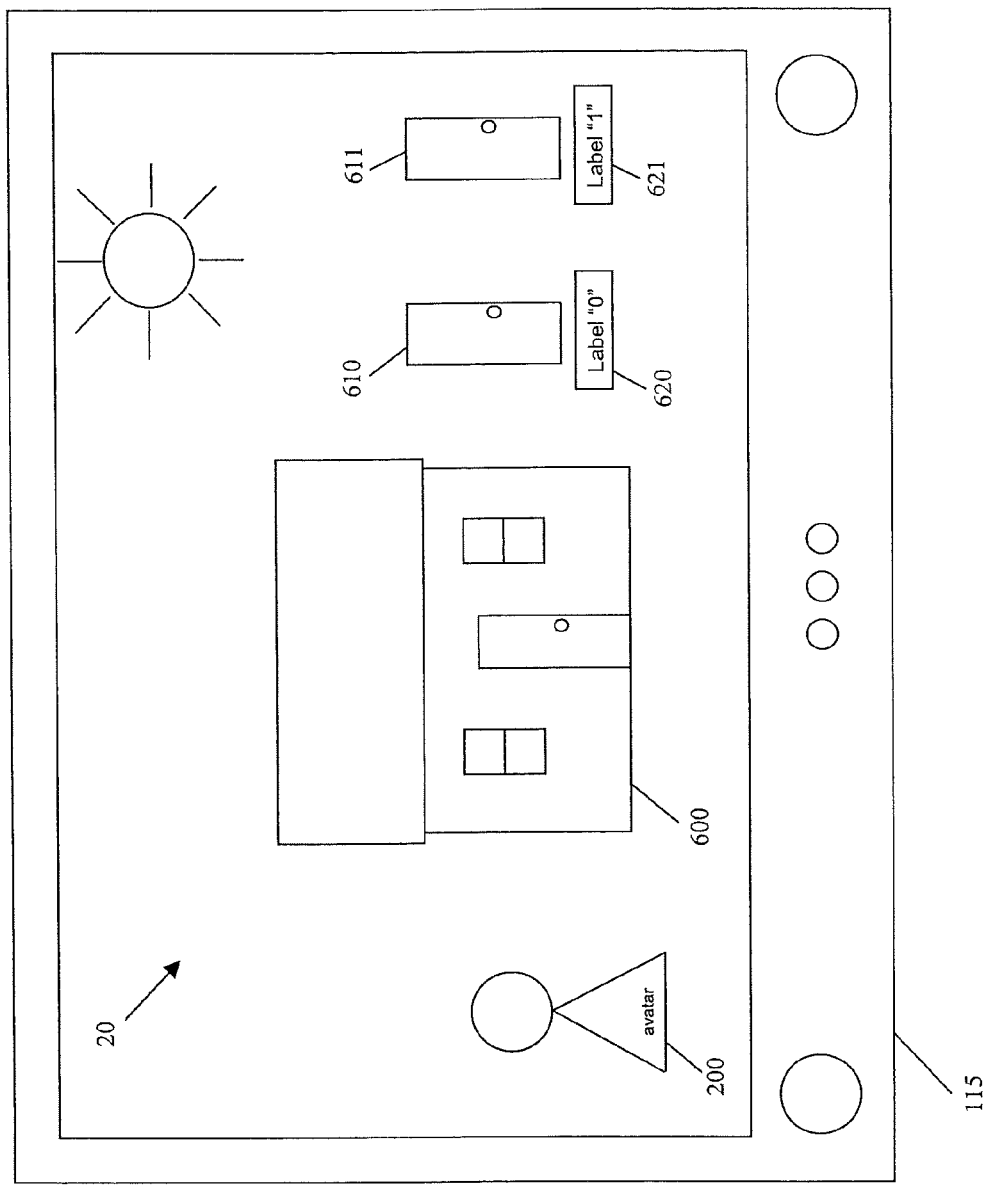
FIG. 2 illustrates a virtual world displayed on a computer display.

Turning now to FIG. 2, an embodiment of a virtual world 20 is displayed to a user via the display 115. The virtual world 20 includes an avatar 200 and a virtual world (VW) object 600. Further, the virtual world 20 includes two virtual world objects (610 and 611) that represent operations, which may be selected by the user. The user can select an operation by interacting with at least one of the virtual world objects 610 and 611. In one embodiment, the interacting may be performed using the mouse 110. The virtual world objects 610 and 611 may also be referred to as "clickables" 610 and 611, respectively. As shown in FIG. 2, a label 620 is associated with the clickable 610 and a label 621 is associated with clickable 611.

Figure 3:
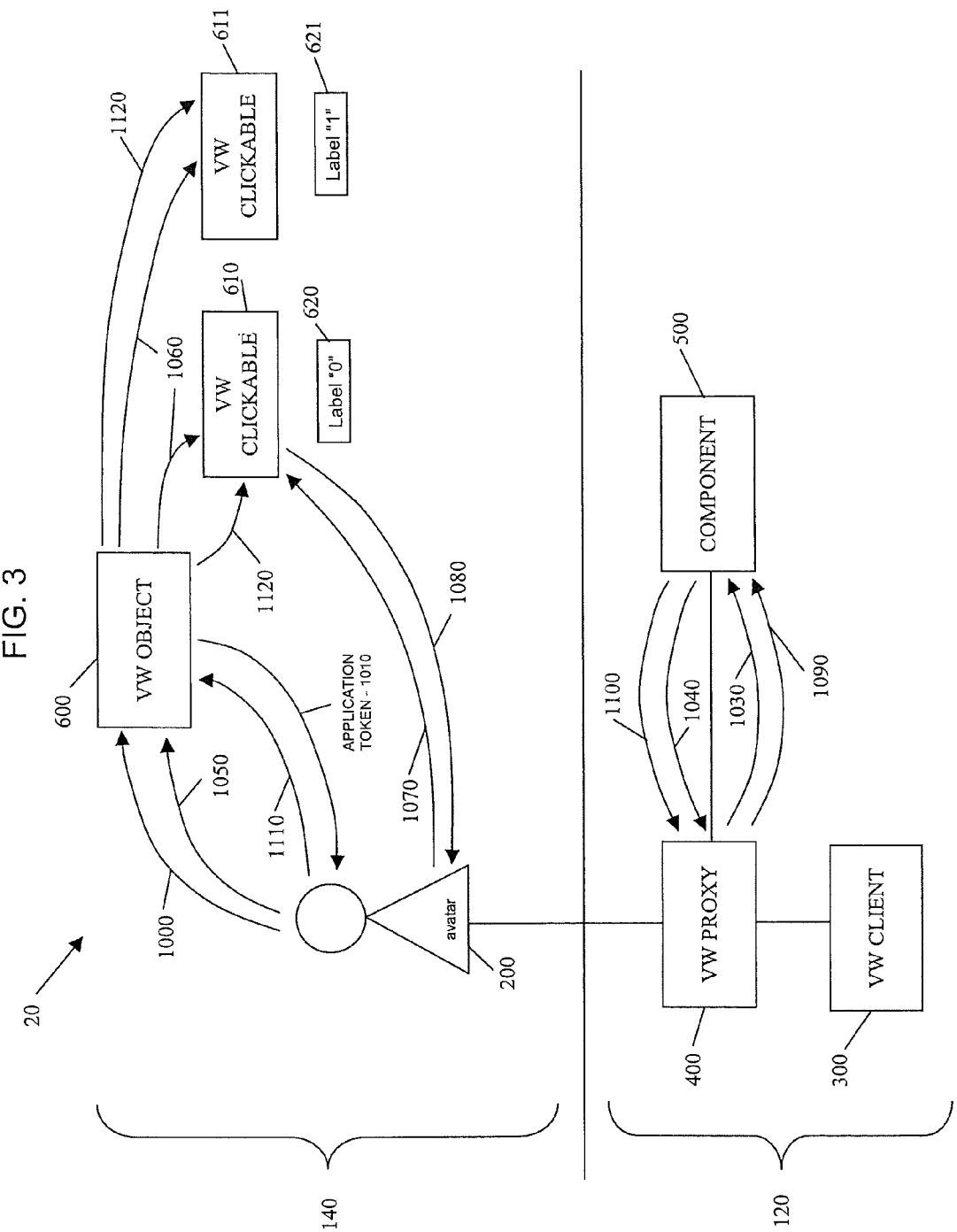
FIG. 3 depicts aspects of interacting with objects in the virtual world.

FIG. 3 depicts aspects of interacting with the VW object 600 displayed in the virtual world 20. In one exemplary embodiment, the virtual world 20 is provided by a virtual world program 140. Reference to the virtual world 20 may include reference to the virtual world program 140 running on the virtual world server or a grid of interconnected resources such as processing systems 100. Referring to FIG. 3, the user interacts with the object 600 using the avatar 200. Examples of interactions (depicted as element 1000) can include touching the object 600 or sending a message to the object 600. Another interaction (depicted as element 1050) can include having the avatar 200 come into proximity with the object 600. Responding to the interaction, the object 600 sends an application token 1010 to the avatar 200. From the avatar 200, the application token 1010 is sent to a VW client 300. On the way to the client 300, the application token 1010 is intercepted by a VW proxy 400. The proxy 400 can be a "plugin" (i.e., dynamically loaded code) to the VW client 300 if the VW client supports plugins. Alternatively, the proxy 400 can be code that is started by the user before or together with the virtual world interface software 120.

Referring to FIG. 3, the VW proxy 400 forwards the application token 1010 (the forwarding depicted by element 1030) to a locally running component 500 that has previously registered itself for that specific application token (i.e., token 1010). In one embodiment, the component 500 responds to receiving the application token 1010 by injecting a three dimensional (3D) in-world GUI request 1040 (i.e., "rez" request) via the proxy 400. The proxy 400 forwards the 3D in-world GUI request 1040 to the VW object 600 (the forwarding depicted as element 1050). The GUI request 1040 instructs the object 600 to display (i.e., "rez") a number of clickables such as the clickables 610 and 611. Each of the clickables is tagged with a generic label (not shown).

Referring to FIG. 3, the VW object 600 parses the GUI request 1040 and, according to the request 1040, instantiates (i.e., "rezzes") (shown as element 1060) the clickables 610 and 611. In one embodiment, the clickables 610 and 611 can be interacted with by being touched by the avatar 200. The label 620 describes the input that will result from the interaction between the avatar 200 and the clickable 610. Similarly, the label 621 describes the input that will result from the interaction between the avatar 200 and the clickable 611.

As each clickable 610 and 611 is processed for display (i.e., "rezzed"), the virtual world 20 sends descriptive packets to the VW client 300 so that each clickable 610 and 611 can be rendered on the user's display 115. Before the descriptive packets reach the client 300, the descriptive packets are intercepted by the VW proxy 400. The proxy 400 modifies the descriptive packets by substituting at least one of a user specific label and a service specific label for each generic label and then passes the modified packets to the client 300 for rendering on the display 115. In one embodiment, the user and service specific labels may be wallet descriptors or Higgins/idemix identities.

Referring to FIG. 3, once the user has interacted (depicted as element 1070) with at least one of the clickables 610 and 611, the selected clickable (at least one of 610 and 611) sends a GUI response message 1080 to the avatar 200 and, thus, to the VW client 300. The GUI response message 1080 contains the generic label associated with the clickable that was selected. Similar to the previous interception, the VW proxy 400 intercepts the GUI response message 1080. The proxy 400 then passes the message 1080, along with the information of which user and specific service labels the proxy 400 previously substituted for the descriptive packets, to the component 500 for further processing (depicted as element 1090).

Referring to FIG. 3, the component 500 will at least one of: (1) reiterate gathering input from the user as described above if required and (2) send (shown as element 1110) a GUI-finished message 1100 via the proxy 400 to the VW object 600. When the object 600 receives the GUI-finished message 1100, the object 600 removes from the virtual world 20 (i.e., "derezzes") (shown as element 1120) at least one of the clickables 610 and 611.

There are several variations of the virtual world interface software 120. In a first variation, the locally running component 500 and the VW proxy 400 are combined into one component. In a second variation, the locally running component 500 and a VW client plugin, if the VW client 300 supports plugins, can be combined into one VW client plugin. A third variation uses a generic locally running component 500 and a modified application token 1010 sent by the VW object 600. In the third variation, the modified application token 1010 contains a reference to a web service, which the generic locally running component 500 interacts with to provide service specific items (such as the clickables 610 and 611 and the labels 620 and 621) to the VW object 600. That is, instead of having the service providing the service specific items, run locally inside the generic component 500, the service can be provided by a service provider somewhere on the Internet.

Figure 4:
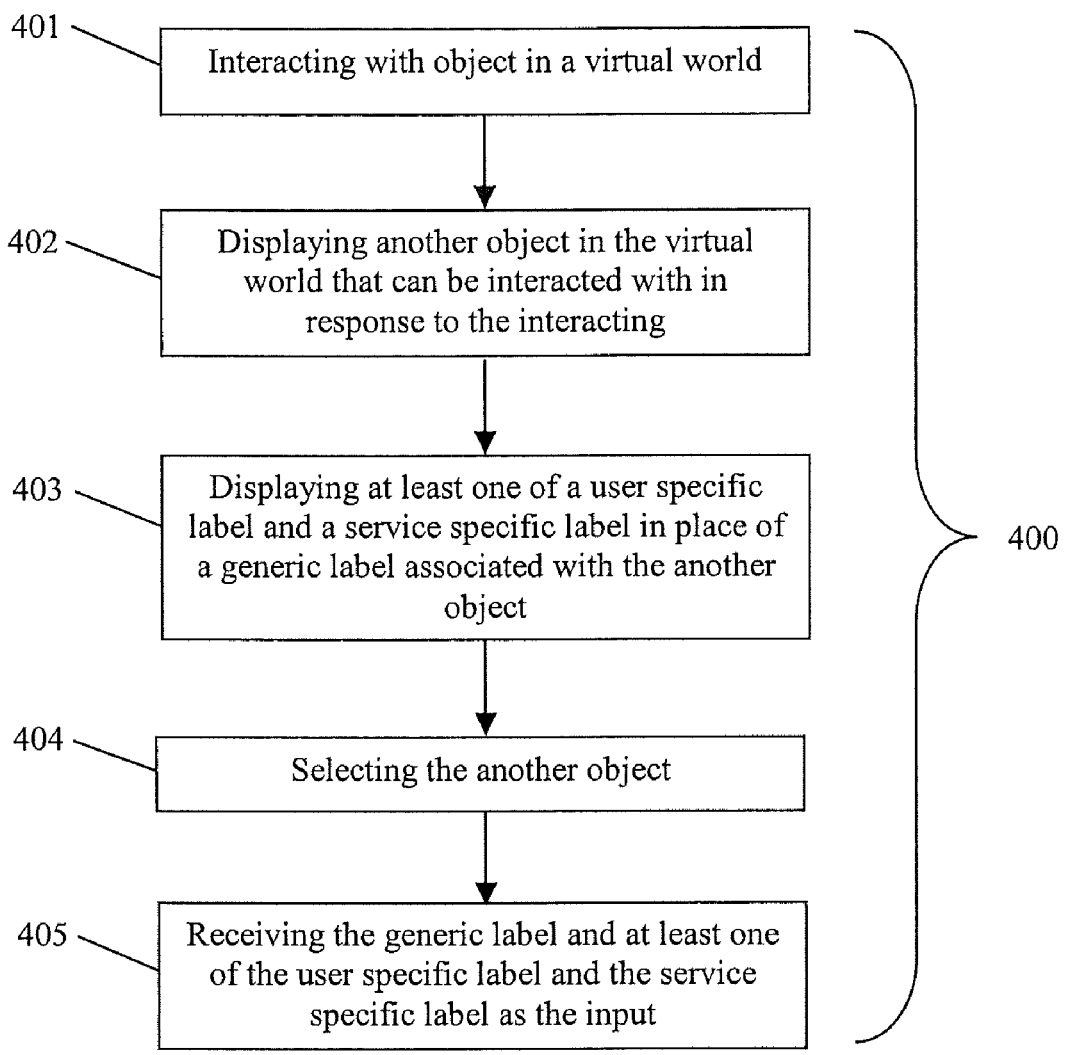
FIG. 4 presents a method for interacting with objects in the virtual world.

FIG. 4 presents one example of a method 400 for receiving input from a user of the virtual world 20. The method 400 calls for (step 401) interacting with the object 600. Further, the method 400 calls for (step 402) displaying the object 611 in response to the interacting. Further, the method 400 calls for (step 403) displaying at least one of a user specific label and a service specific label in place of a generic label associated with the object 611. Further, the method 400 calls for (step 404) selecting the object 611. Further, the method 400 calls for (step 405) receiving the generic label and the at least one of the user specific label and the service specific label as the input. The method 40 can also include reiterating at least one of the interacting, the displaying the object 611, the displaying at least one of a user specific label and a service specific label in place of a generic label associated with the object 611, the selecting and the receiving if more input is required or removing from display the object 611 if no further input is required.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention.

The article of manufacture can be included as a part of a computer system or sold separately.

Additionally, at least one program storage device readable by a machine, tangibly embodying at least one program of instructions executable by the machine to perform the capabilities of the present invention can be provided.

Elements of the embodiments have been introduced with either the articles "a" or "an." The articles are intended to mean that there are one or more of the elements. The terms "including" and "having" are intended to be inclusive such that there may be additional elements other than the elements listed. The term "or" when used with a list of at least two terms is intended to mean any term or combination of terms.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer program product stored on machine-readable media, the product comprising machine-executable instructions for receiving input form a user of a virtual world, the instructions comprising:

interacting with an object using an avatar, the object and avatar displayed in the virtual world;
   sending an application token from the object to the avatar;
   forwarding the application token from the avatar to a client;
   intercepting the application token with a proxy;
   forwarding the application token from the proxy to a locally running component;
   injecting a graphical user interface (GUI) request from the component to the proxy;
   forwarding the GUI request from the proxy to the object;
   displaying another object in the virtual world in response to the request, the another object adapted to interact with the avatar;
   sending descriptive packets from a virtual world program to the client, the packets comprising information related to the another object;
   intercepting the packets using the proxy and modifying the packets by substituting at least one of user specific labels and service specific labels for a generic label associated with the another object;
   sending the modified packets from the proxy to the locally running component;
   displaying the at least one of the user specific label and the service specific label to the user;
   selecting the another object as the input;
   sending a GUI response message comprising the generic label in response to the selecting from the another object to the avatar;
   intercepting the GUI response message using the proxy and modifying the GUI response message by adding the at least one of the user specific label and the service specific label;
   sending the modified GUI response message to the locally running component; and
   receiving the modified GUI response message to receive the input.

2. The product of claim 1, the instructions further comprising reiterating at least one of the steps of claim 1 if more input is required or removing from display the another object if no further input is required.

3. The product of claim 1, wherein the locally running component and the proxy are combined into a combined component.

4. The product of claim 1, wherein the locally running component and a virtual world client plugin are combined into a combined virtual world client plugin integrated with the client.

5. The product of claim 1, wherein the application token is modified to include a reference to an Internet web service with which the locally running component interacts to receive the at least one of the user specific label and the service specific label.

6. The product of claim 1, wherein the user specific label comprises at least one of a wallet descriptor, a Higgins identity, and an idemix identity.

7. The product of claim 1, wherein the locally running component is registered with the virtual world program for the application token.

8. The product of claim 1, wherein the another object appears three-dimensional.

* * * * *